(12) United States Patent
Kume et al.

(10) Patent No.: US 6,683,843 B2
(45) Date of Patent: Jan. 27, 2004

(54) TURNTABLE DRIVING DEVICE FOR A DISC PLAYER

(75) Inventors: Hideki Kume, Osaka (JP); Teruaki Sogawa, Osaka (JP); Takayuki Murakami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 316 days.

(21) Appl. No.: 09/874,868

(22) Filed: Jun. 5, 2001

(65) Prior Publication Data

US 2001/0048658 A1 Dec. 6, 2001

(30) Foreign Application Priority Data

Jun. 6, 2000 (JP) .................................. P2000-169669

(51) Int. Cl.7 ............................................... G11B 23/00
(52) U.S. Cl. ...................................................... 369/269
(58) Field of Search ................................. 369/269, 271, 369/264, 258, 270; 360/99.04, 78.02, 98.07; 310/51, 90, 44

(56) References Cited

U.S. PATENT DOCUMENTS 5,796,547 A * 8/1998 Ohkita et al. ............ 360/99.04
6,005,311 A * 12/1999 Matsushima ................ 310/51
6,023,114 A * 2/2000 Mori et al. .................... 310/90
6,041,033 A * 3/2000 Otsubo et al. .............. 369/271
6,317,287 B1 * 11/2001 Yano et al.
6,388,982 B2 * 5/2002 Ogusu ........................ 369/264

FOREIGN PATENT DOCUMENTS

JP 2-50865 2/1990
JP 8-87825 4/1996

* cited by examiner

Primary Examiner—Allen Cao
(74) Attorney, Agent, or Firm—Rosenthal & Osha L.L.P.

(57) ABSTRACT

A turntable driving device has a spindle motor 5, a bearing 7, and a wire spring 9. The spindle motor 5 has a rotation shaft 11 which is to be coupled to the turntable 3. The bearing 7 is placed on the lateral side of the rotation shaft 11, and has a pair of inclined faces 7a that are opened in the side of the rotation shaft 11 so as to sandwich the rotation shaft 11, and that are formed to be abuttable against the rotation shaft 11. The wire spring 9 is a member for urging the bearing 7 toward the rotation shaft 11.

5 Claims, 1 Drawing Sheet

TURNTABLE DRIVING DEVICE FOR A DISC PLAYER

BACKGROUND OF THE INVENTION

1. Field of the Invention

The present invention relates to a turntable driving device, and more particularly to a turntable driving device for rotating a turntable of a disc player.

2. Description of the Related Art

Usually, a disc player for playing back a disc such as a CD or an MD comprises a turntable on which a disc is to be placed, and a turntable driving device for rotating the turntable. The turntable driving device comprises a motor having a rotation shaft which is to be coupled to the turntable.

In this device, when the motor is driven and the rotation shaft is rotated, the turntable is rotated. At this time, rattling often occurs in the rotation shaft. When the rotation shaft rattles, the turntable is unstably rotated, whereby the playback and record operations on a disc are sometimes adversely affected.

In order to eliminate such rattling of the rotation shaft, techniques have been proposed in JP-2-50865 and JP8-87825.

JP-2-50865 discloses a configuration in which a rotation shaft of a motor is urged in a predetermined direction so as to eliminate rattling of the rotation shaft. In the configuration, there is a possibility that the rotation shaft wobbles in a direction other than the predetermined direction. In a device disclosed in JP-8-87825, a triangular bearing through which a rotation shaft is passed is disposed, and one edge of the bearing is laterally urged by a torsion spring, thereby suppressing rattling of the rotation shaft. Even in a state where the bearing is urged by the torsion spring, however, the bearing can be moved in a direction perpendicular to the urging direction, so that the rotation shaft may wobble.

SUMMARY OF THE INVENTION

It is an object of the invention to prevent shaft wobbling from occurring while suppressing rattling of a rotation shaft of a motor.

The turntable driving device according to a first aspect of the invention is a turntable driving device for rotating a turntable of a disc player, and comprises a motor, a bearing, and an urging member. The motor has a rotation shaft which is to be coupled to the turntable. The bearing is placed on a lateral side of the rotation shaft, and has a pair of inclined faces that are opened in a side of the rotation shaft so as to sandwich the rotation shaft, and that are formed to be abuttable against the rotation shaft. The urging member is a member for urging the bearing toward the rotation shaft.

In this device, when the motor is driven and the rotation shaft is rotated, the turntable is rotated. At this time, the bearing receives the urging force of the urging member to laterally press the rotation shaft. Therefore, the rotation shaft is prevented from rattling. The rotation shaft abuts against the pair of inclined faces of the bearing so as to be sandwiched therebetween.

According to this configuration, the rotation shaft is supported at two positions located across the rotation shaft by the pair of inclined faces. Unlike a conventional turntable driving device in which a bearing abuts only at one position against a rotation shaft, therefore, the rotation shaft is not moved with respect to the bearing in a direction different from the urging direction. As a result, wobbling of the rotation shaft can be suppressed.

The turntable driving device according to a second aspect of the invention is configured so that, in the device of the first aspect, the pair of inclined faces are formed into a V-like shape.

In the device, the rotation shaft of the motor is supported by two edges of the V-like portion of the bearing.

According to this configuration, wobbling of the rotation shaft can be suppressed by a simple shape.

The turntable driving device according to a third aspect of the invention is configured so that, in the device of the first or second aspect, when the bearing abuts against the rotation shaft, an intersection of normal lines of the pair of inclined faces coincides with a rotation axis of the rotation shaft.

In the device, when the bearing abuts against the rotation shaft, the intersection of the normal lines of the pair of inclined faces coincides with the rotation axis of the rotation shaft, and hence the rotation shaft is stably rotated.

The turntable driving device according to a fourth aspect of the invention is configured so that, in the device of any one of the first to third aspects, the bearing is formed by a self-lubricating resin.

In the device, since the bearing is formed by a self-lubricating resin, a friction which, when the bearing abuts against the rotation shaft, is produced between the bearing and the rotation shaft is suppressed.

The turntable driving device according to a fifth aspect of the invention is configured so that, in the device of any one of the first to fourth aspects, the self-lubricating resin is a polyacetal resin.

In the device, since a polyacetal resin is used as the self-lubricating resin, the friction between the bearing and the rotation shaft can be reduced.

DETAILED DESCRIPTION OF THE PREFERRED EMBODIMENTS

Now, a description will be given in more detail of preferred embodiments of the present invention with reference to the accompanying drawings.

Figure 1:
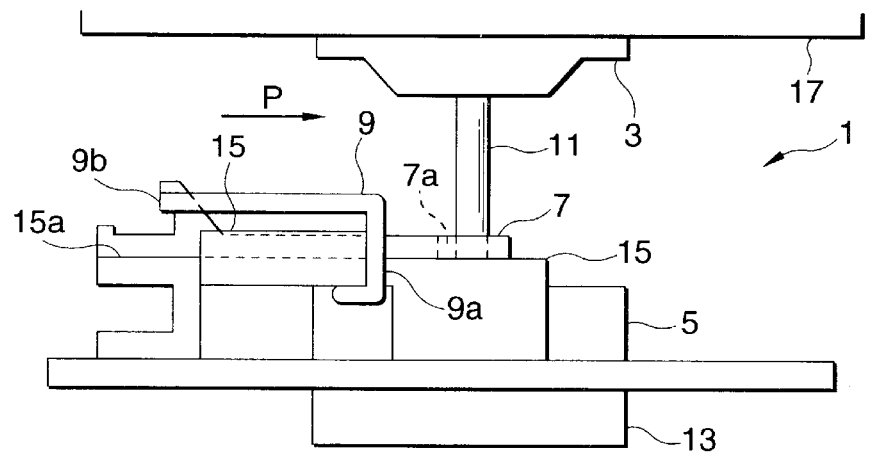
FIG. 1 is a schematic longitudinal section view showing a turntable device in which an embodiment of the invention is employed.
Figure 2:
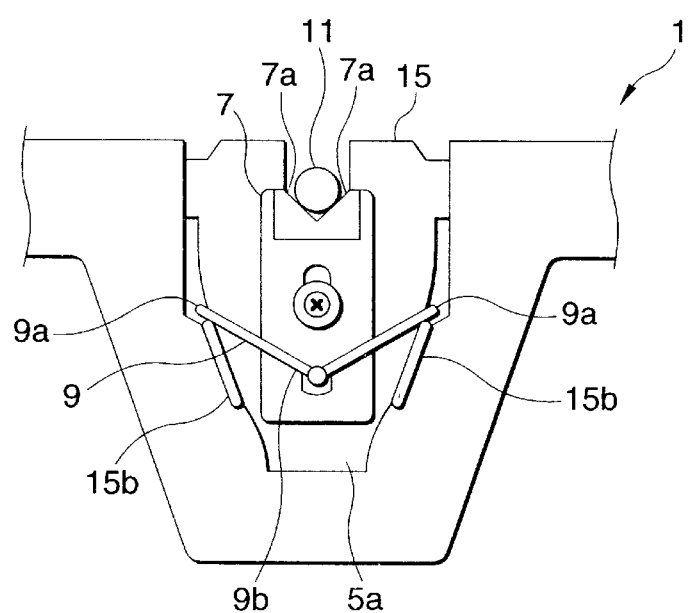
FIG. 2 is a schematic plan view showing the turntable device.

FIGS. 1 and 2 show a turntable device in which an embodiment of the invention is employed. A turntable driving device 1 is a device for rotating a turntable 3 on which a disc 17 is placed, and comprises a spindle motor 5, a bearing 7, a motor bracket 15, and a wire spring 9.

The spindle motor 5 is configured by a rotation shaft 11 which vertically elongates, and a motor body 13 which rotates the rotation shaft 11. The tip end of the rotation shaft 11 is coupled to a center portion of the turntable 3, so that the rotation shaft 11 and the turntable 3 can be integrally rotated.

Figure 3:
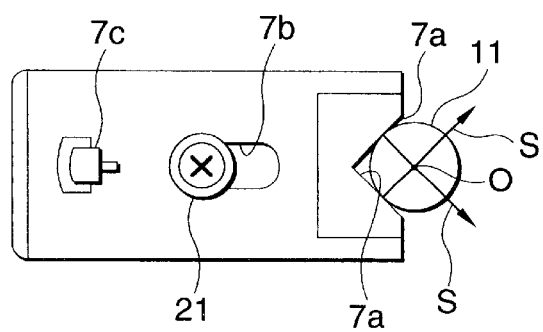
FIG. 3 is a longitudinal section view showing a bearing of the turntable device.

The bearing 7 is a member for supporting the rotation shaft 11, and placed on the lateral side of the rotation shaft 11. As shown in FIG. 2, a pair of inclined faces 7a which are abuttable against the rotation shaft 11 are formed so as to be opened in the side of the rotation shaft 11. In the embodiment, the inclined faces are formed into a V-like shape in a plan view. As shown in FIG. 3, the pair of inclined faces 7a are formed so as to have an inclination angle at which, when the pair of inclined faces 7a abut against the rotation shaft 11, an intersection o of normal lines s of the inclined faces 7a coincides with the rotation center of the rotation shaft 11. A hole 7b which longitudinally elongates is formed in a center portion of the bearing 7. A stepped screw 21 which is secured to the motor bracket 15 is passed through the hole 7b. According to this configuration, the bearing 7 can be relatively moved by a given distance with respect to the motor bracket 15. An engaging claw 7c with which the wire spring 9 is engaged is disposed in a rear end portion of the bearing 7. The bearing 7 is formed by a self-lubricating resin such as a polyacetal resin, whereby a friction force which is produced between the bearing 7 and the rotation shaft 11 is reduced.

The motor bracket 15 is a sheet metal member which is used for positioning the spindle motor 5 with respect to a chassis 19. The motor bracket 15 has a flat face 15a which laterally extends from the upper face of the motor body 13. The bearing 7 is placed on the flat face 15a in a relatively movable manner. In each of the side ends of the motor bracket 15, an engaging face 15b with which the wire spring 9 is engaged is formed so as to upward extend.

The wire spring 9 is a member for urging the bearing 7 toward the rotation shaft 11. In the wire spring, both end portions 9a are respectively engaged with the engaging faces 15b of the motor bracket 15, and an intermediate portion 9b is engaged with the engaging claw 7c of the bearing. According to this configuration, the pair of inclined faces 7a abut against the rotation shaft 11 to press the rotation shaft 11 in the direction of the arrow P in FIG. 1.

Next, the operation of the turntable driving device 1 will be described.

When the disc 17 is placed on the turntable 3 and playback of the disc is instructed through an operation section (not shown) of a disc player, the spindle motor 5 is driven and the rotation shaft 11 is rotated, whereby the turntable 3 is rotated and the disc 17 is rotated. Then, a control section which is not shown performs a tracking servo control on the disc, and information on the disc 17 is read out by a pickup (not shown).

At this time, the bearing 7 receives the urging force of the wire spring 9 to press the rotation shaft 11 in the direction of the arrow P, whereby the rotation shaft 11 is prevented from rattling with respect to the motor body 13. The pair of inclined faces 7a of the bearing 7 support the rotation shaft 11 at two positions so as to sandwich the shaft. Unlike a conventional turntable driving device in which a bearing abuts only at one position against the rotation shaft 11, therefore, the rotation shaft 11 is not moved with respect to the bearing 7 in a direction different from the urging direction. In the device 1 of the embodiment, consequently, wobbling of the rotation shaft 11 can be suppressed. In the state where the bearing 7 abuts against the rotation shaft 11, the intersection o of the normal lines s of the pair of inclined faces 7a coincides with the rotation center of the rotation shaft 11, and hence the rotation of the rotation shaft 11 is relatively stabilized. Since the bearing 7 is formed by a polyacetal resin, the friction force which, when the bearing 7 presses the rotation shaft 11, is produced therebetween is reduced.

Other Embodiments (a) The inclined faces 7a are not restricted to flat faces, and may be formed into a curved shape such as a part of an oval.

(b) The opening angle between the two inclined faces 7a is not restricted to an angle which allows the intersection of the normal lines of the inclined faces 7a to coincide with the rotation center of the rotation shaft 11. When the two inclined faces are opened at an angle of 90 or more deg., the tow abutting positions between the bearing 7 and the rotation shaft 11 are further separated from each other, and hence wobbling of the rotation shaft 11 can be suppressed more surely.

(c) The means for urging the bearing 7 is not restricted to the wire spring 9, and may be configured by other means such as a coil spring. In the case where a coil spring is used, the spring constant is stable, and hence the friction force which is produced between the bearing and the rotation shaft 11 is stabilized.

According to the invention, a rotation shaft of a motor is supported by a pair of inclined faces that are opened in the side of the rotation shaft so as to sandwich the rotation shaft, and that are formed to be abuttable against the rotation shaft. Therefore, shaft wobbling can be prevented from occurring while suppressing rattling of the rotation shaft of the motor.

What is claimed is:

1. A turntable driving device for rotating a turntable of a disc player, comprising:

a motor having a rotation shaft adapted to be coupled to the turntable;

a bearing disposed on a lateral side of said rotation shaft, said bearing comprising a pair of inclined faces that define an opening on a side toward said rotation shaft, wherein said inclined faces are formed to be abuttable against said rotation shaft; and an urging member for urging said bearing toward said rotation shaft.

2. A turntable driving device according to claim 1, wherein said pair of inclined faces are formed into a V-like shape.

3. A turntable driving device according to claim 1, wherein, when said bearing abuts against said rotation shaft, an intersection of normal lines of said pair of inclined faces coincides with a rotation axis of said rotation shaft.

4. A turntable driving device according to claim 1, wherein said bearing is formed by a self-lubricating resin.

5. A turntable driving device according to claim 4, wherein said self-lubricating resin is a polyacetal resin.

* * * * *